(12) United States Patent
Reed

(10) Patent No.: US 7,121,604 B2
(45) Date of Patent: Oct. 17, 2006

(54) VEHICLE CARGO BED EXTENDER HAVING A PIN LOCK ASSEMBLY

(75) Inventor: Troy R. Reed, Livonia, MI (US)

(73) Assignee: Plastech Engineered Products, Inc., Dearborn, MI (US)

( * ) Notice: Subject to any disclaimer, the term of this patent is extended or adjusted under 35 U.S.C. 154(b) by 0 days.

(21) Appl. No.: 10/938,166

(22) Filed: Sep. 10, 2004

(65) Prior Publication Data

US 2006/0055194 A1    Mar. 16, 2006

(51) Int. Cl.
*B62D 33/08* (2006.01)
*B62C 1/06* (2006.01)

(52) U.S. Cl. ................................... 296/26.11

(58) Field of Classification Search ............ 296/26.11, 296/26.08, 26.01, 37.1, 37.6, 50, 57.1; 292/139
See application file for complete search history.

(56) References Cited

U.S. PATENT DOCUMENTS

| | | | | |
|---|---|---|---|---|
| 960,386 | A * | 6/1910 | Obert | 292/66 |
| 3,341,239 | A * | 9/1967 | Wheeler | 292/139 |
| 5,823,596 | A * | 10/1998 | Kulesza | 296/26.08 |
| 5,911,464 | A * | 6/1999 | White | 296/26.11 |
| 6,402,215 | B1 * | 6/2002 | Leitner et al. | 296/26.11 |
| 6,425,618 | B1 * | 7/2002 | Garland et al. | 296/3 |
| 6,719,345 | B1 * | 4/2004 | Ootsuka et al. | 296/26.08 |
| 2001/0005085 | A1 * | 6/2001 | Bauer | 296/57.1 |
| 2002/0023938 | A1 * | 2/2002 | Kmita et al. | 224/403 |
| 2003/0030295 | A1 * | 2/2003 | Brown et al. | 296/26.08 |
| 2003/0116986 | A1 * | 6/2003 | Ootsuka et al. | 296/26.08 |
| 2003/0127873 | A1 * | 7/2003 | Reed | 296/26.08 |
| 2003/0146637 | A1 * | 8/2003 | Leitner et al. | 296/26.11 |
| 2004/0080174 | A1 * | 4/2004 | Buelna | 296/26.11 |
| 2005/0012354 | A1 * | 1/2005 | Leitner et al. | 296/26.08 |

* cited by examiner

*Primary Examiner*—H Gutman
(74) *Attorney, Agent, or Firm*—Rader, Fishman & Grauer, PLLC

(57) ABSTRACT

A vehicle cargo bed extender for a vehicle of the present invention includes a pair of sidewalls spaced from one another and a center wall extending therebetween. At least one lock assembly is disposed upon one of the sidewalls of the bed extender and includes a locking pin that operable to be selectively extended and retracted to engage with and disengage from the vehicle sidewall respectively. The lock assembly further includes a handle and a lever arm, which cooperate to facilitate the extension and retraction of the locking pin such that said extension of the locking pin locks the bed extender to the vehicle sidewall in the stowed and deployed positions to prevent any uncommanded movement of the extender. The locking assembly further operative to hold the locking pin in the extended and retracted positions respectively until selectively moved between positions.

2 Claims, 6 Drawing Sheets

VEHICLE CARGO BED EXTENDER HAVING A PIN LOCK ASSEMBLY

BACKGROUND OF THE INVENTION

1. Field of the Invention

The present invention relates, generally, to a vehicle cargo bed extender, and more specifically, to a bed extender that is adapted to pivot between a deployed position over a down tailgate and a stowed position forward of the tailgate and having a pin lock assembly adapted to selectively lock the bed extender in either the deployed or the stowed position.

2. Description of the Related Art

Pickup trucks are well known vehicles having rear cargo areas that are employed for utilitarian purposes. A representative example of this type of vehicle is generally indicated at 20 in FIG. 1. As is well known in the art, pickup trucks typically include a cab 22 in which the vehicle operator sits and a cargo area, generally indicated at 24. The cargo area 24 is typically disposed adjacent and to the rear of the cab 22. The cargo area 24 is typically defined by a bed 26 and pair of upstanding sidewalls 28 spaced from one another on either side of the bed 26. In addition, the vehicle 20 typically includes a rear wall or "tailgate" 30 that extends between the pair of sidewalls 28 at one end of the bed 26 and a front wall 32 located at the other end of the bed 26 opposite to the tailgate 30. The rear wall or tailgate 30 is usually hingedly mounted to the bed 26 so as to be rotatable between an upright position (FIG. 1) and an extended position as shown in FIG. 2. When it is in its extended position, the tailgate 30 is said to be "down" or "open" and is usually disposed substantially co-planar with the bed 26 of the vehicle cargo area 24. When it is disposed in its upright position, the tailgate 30 extends substantially perpendicularly between the pair of sidewalls 28. In this disposition, together the sidewalls 28, the tailgate 30 and front wall 32 define a perimeter of the vehicle cargo area 24.

Numerous accessories have been developed for the purpose of augmenting the utilitarian functions of the cargo area 24 in such vehicles. For example, toolboxes and other, similar storage devices have been employed to provide a secure enclosure for storing tools and other valuable implements in the otherwise open cargo area 24 of vehicles, such as pickup trucks 20. Such toolboxes and the like are typically mounted between the sidewalls 28 and the front wall 32 proximate to the cab 22 of the vehicle 20. While such toolboxes adequately function for their intended purposes, they also act to reduce the remaining available cargo area 24 of the vehicle 20.

Another common accessory employed in connection with the cargo area of a vehicle such as a pickup truck is known as a "Tonneau Cover". Tonneau covers known in the related art are often constructed of canvas, wood, or metal panels and extend between the upper margins of the sidewalls 28 from the front wall 32 generally to the tailgate 30. Tonneau covers serve to enclose the cargo area 24 thereby providing a modicum of protection for tools and other cargo. Tonneau covers also act to reduce the aerodynamic drag caused by fully uncovered cargo areas. Partial tonneau covers are also known that extend from the front wall 32 but that do not continue the entire distance to the tailgate. These partial covers offer some aerodynamic benefits and also allow easier access to the rearmost portion of the cargo area and tailgate.

Another vehicle accessory that has gained popularity in recent years is generally known as a "Truck Bed Extender". Truck bed extenders known in the related art are usually employed with the tailgate 30 "down" or in the extended position as shown in FIG. 2. The bed extender is mounted to the sidewalls 28 and is supported by the tailgate 30. In this way, truck bed extenders known in the related art serve to increase the effective length of the bed 26 of the pickup truck 20.

Numerous variations on the truck bed extender theme currently exist in the related art. For example, bed extenders are currently in use that are constructed of tubular steel, or aluminum to enclose the area above the tailgate 30 when it is down. Alternatively, several styles of enclosed boxes that stow in the truck bed when not in use and that operatively move out over the tailgate to extend the bed area have been produced. Some of these are structurally robust enough to extend out beyond the end of the tailgate. Still other bed extenders are known in the related art that include a series of light-weight panels that are designed to be foldable when not in use or when the tailgate 30 is disposed in its upright position.

While such bed extenders known in the related art have generally worked for their intended purposes, disadvantages still remain regarding their use for certain vehicle applications. For example, in response to customer demands for multi-featured vehicles and vehicles with accessory equipment that can fulfill different roles, manufacturers are attempting to provide specialized bed extenders to vehicles that have rear cargo areas. More specifically, along with traditional pick-up truck type vehicles (FIG. 1), manufacturers are also now producing multi-purpose vehicles that combine some of the features of traditional pick-up trucks with some of the features of the common forms of sport-utility vehicles (SUVs). These vehicles are generally referred to as SUV/Pickup crossovers. As shown in FIG. 3, a typical example of one these crossover style vehicles is generally indicated at 40.

The crossover vehicle 40 provides the four-place cabin of an SUV and a foreshortened rear bed of a pickup as a cargo area. Similar to the pickup truck of FIG. 1, the crossover vehicle 40 in FIG. 3 also has a cargo area 24 that is defined by a bed 26 and pair of upstanding sidewalls 28 spaced from one another. A tailgate 30 extends between the pair of sidewalls 28 at the rear end of the bed 26 and a front wall 32 is located at the other end of the bed 26 opposite to the tailgate 30. Due to the reduced carrying capacity of the shorter rear bed 26 compared to traditional pickups (FIG. 1), and to add to their multi-function role, it is desirous to provide these vehicles with bed extenders. However, the shorted rear bed 26 of the crossover vehicle 40 makes the use of conventional truck bed extenders highly problematic. This is due to the fact that a crossover vehicle 40 most often employs some type of bed accessory, such as a tool box 34 or tonneau cover 36 discussed above, which interferes with the proper deployment of a conventional bed extender.

In addition to the problem of fitting a conventional bed extender in crossover vehicles such as these, it is a particular design and selling feature to provide the vehicle user with the ability to make quick changes from one manner, or mode of use of the vehicle to another. Thus, it is a design intent of the crossover vehicle to provide the user the ability to open the tailgate, quickly place the bed extender, and be ready to use it immediately. To rapidly accomplish the vehicle changeover to the extended bed mode of operation, it is desirable to employ a pivoting bed extender.

In this manner, as shown in FIGS. 5 and 6, the specialized bed extender is pivotably mounted to the bed sidewalls 28 of the crossover vehicle so that it may lay stowed in the bed, then when desired, be quickly pivoted 180 degrees out over the down tailgate 30 for use. In addition to having a simple pivot point, the specialized bed extender may also incorporate additional structure that allows the extender to move rectilinearly with respect to the vehicle sidewalls to provide adequate clearance as it is moved between its stowed and deployed positions.

Given the consumer demand for multi-purpose vehicle accessories, as mentioned above, it should be appreciated that it is also desirous to employ a bed extender with a similar pivotal installation in traditional pick-up truck cargo areas as well (FIGS. 1 and 2). While a pivoting bed extender provides improvements that overcome the drawbacks of conventional extenders, their use presents another problem. Due to the ease of movement of a pivoting bed extender between its stowed and deployed positions, it has been found that additional retaining devices are required to secure the extender and avoid displacement and uncommanded movement of the bed extender while the vehicle is in use.

Since conventional non-pivoting bed extenders are generally fixed in some manner to the vehicle, various types of retaining and locking devices for bed extenders are known in the art. However, they are generally complex in their design, construction, and use. The most common forms of conventional bed extender locking devices employ spring-loaded plungers mechanisms. To deal with the internal stresses of the spring, the plunger locking devices must be made of substantially strong materials and also require a number of machining processes to produce the internal surfaces necessary to retain the spring and plunger within its housing. The complex structure of the plunger locking devices further causes them to be prone to jamming and corrosion in the environment to which the bed extender is exposed.

Additionally, when spring loaded plunger type locking devices are employed to retain conventional bed extenders in a cargo bed, their spring biasing to the locked and extended position requires that the locking devices be simultaneously actuated before the bed extender can be either released or locked in place. This makes it very difficult for a single individual to operate these locking mechanisms so that the bed extender can be moved from one position to the other. In other words, the conventional spring loaded locking devices require that more than one person be available to simultaneously actuate the separate locking devices that are typically installed on opposite sides of the bed extender. Furthermore, if a conventional locking device is adapted so that it may be actuated and temporarily latched into an unlocked position to overcome this limitation, the adaptation adds further complexity and cost to the device.

Simply stated, the conventional approaches to locking and retaining devices as employed in conventional type bed extenders are complex, expensive, and difficult to use. Moreover, an attempt to employ conventional locking and retaining devices with the pivotal style bed extenders often fail to provide the desired result of a simplified, quickly changeable bed extender designed with the current consumer demands in mind.

Accordingly, there remains a need in the art for a cargo bed extender having a locking mechanism that can be used in either a crossover vehicle cargo bed or in a standard pick-up cargo bed where space to stow the extender is limited. There also remains a need in the related art for a bed extender that includes a locking mechanism that is simple in design, cost effective in materials and construction, easy to use, and latchable in the open and closed positions so that the bed extender may be moved between its operative positions by a single individual. Furthermore, there remains a need in the art for a bed extender that includes an improved locking and retaining device that is simple, cost effective, and latchable in the open and closed positions as well.

SUMMARY OF THE INVENTION AND ADVANTAGES

The present invention overcomes the disadvantages in the related art in a vehicle cargo bed extender that is adapted to be employed in conjunction with a vehicle having a cargo bed defined by a pair of upstanding bed sidewalls spaced from one another on either side of the vehicle cargo bed. A rear wall is extends between the upstanding sidewalls at one end of the vehicle bed. Furthermore, the rear wall is rotatable from an upright position to an extended position so as to be disposed substantially coplanar with the vehicle bed. Accordingly, the vehicle cargo bed extender of the present invention includes a pair of sidewalls spaced from one another, a center wall extending between the pair of sidewalls, the pair of sidewalls and the center wall cooperating to define a bed extender having an open end.

At least one lock assembly having a main body is disposed upon one of the sidewalls of the bed extender. The lock assembly includes a locking pin that is operable to be selectively extended and retracted from one end of the main body to engage with and disengage from the vehicle sidewall. The lock assembly further includes a handle disposed at the end of the main body opposite the locking pin and a lever arm disposed therebetween. The handle and lever arm are operative to move between a first and a second position thereby cooperating to facilitate the extension and retraction of the locking pin from the main body such that the extension of the locking pin locks the bed extender to the vehicle sidewall in the stowed and deployed positions to prevent any uncommanded movement of the extender. The locking assembly is further operative to hold the locking pin in the extended and retracted positions respectively until selectively moved between positions.

Thus, the vehicle cargo bed extender of the present invention overcomes the drawbacks and disadvantages of the prior art by providing an increase in the effective cargo area of the vehicle while, at the same time, providing a pivoting means for rapid changeover from one mode of vehicle operation to another. The present invention also provides an improved locking and retaining mechanism to lock the bed extender in both the deployed and stowed positions to prevent uncommanded movement. The locking mechanism of the present invention is simple, cost effective, easy to use, and remains in the extended and retracted position until selectively moved.

Other advantages of the present invention will be readily appreciated, as the same becomes better understood by reference to the following detailed description when considered in connection with the accompanying drawings as described below.

DETAILED DESCRIPTION OF THE PREFERRED EMBODIMENTS

Figure 1:
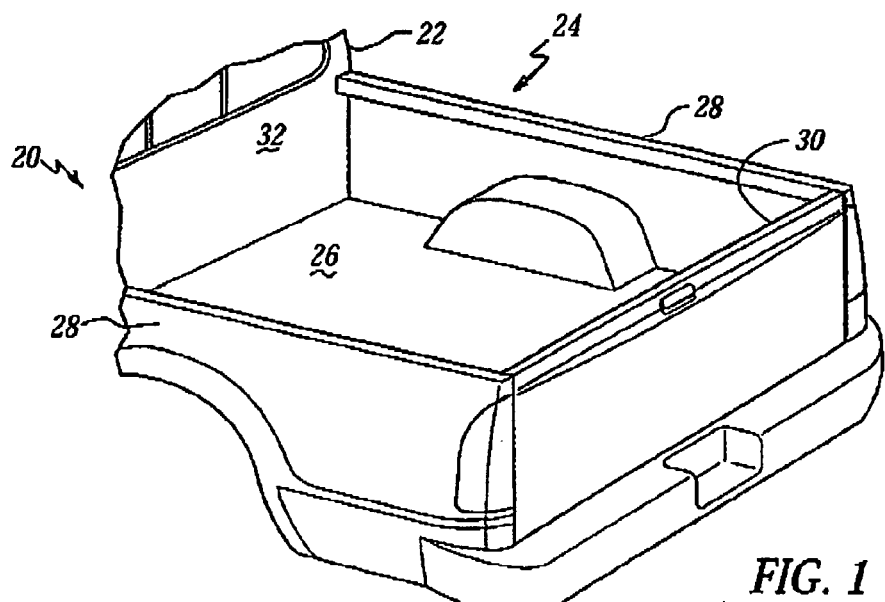
FIG. 1 is a partial perspective view of a pickup type vehicle having a cargo area defined by a pair of sidewalls, a front wall and a rear wall, with the rear wall disposed in its upright "closed" position.
Figure 2:
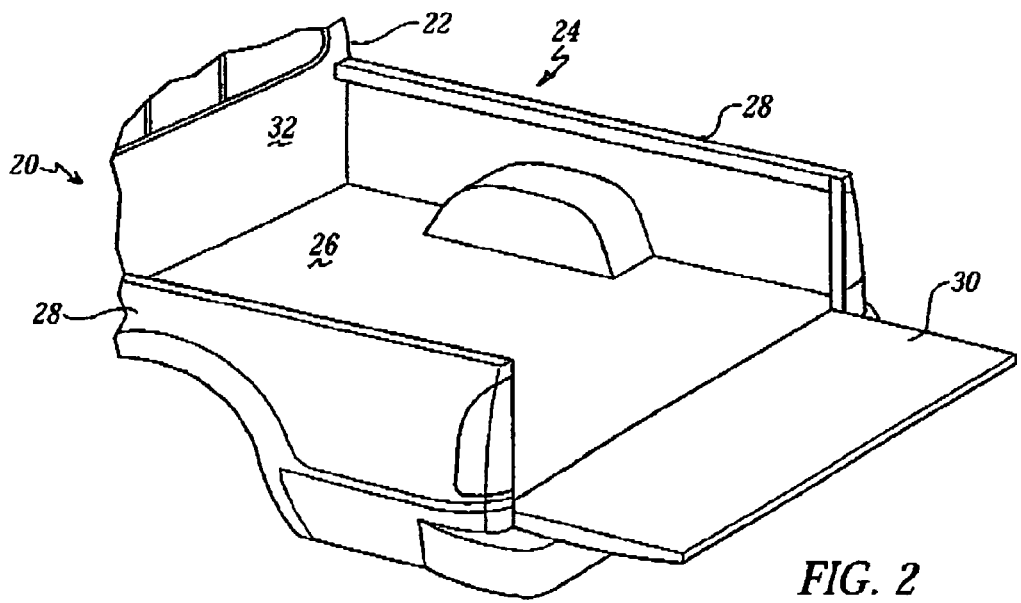
FIG. 2 is a partial perspective view of a pickup type vehicle having a cargo area defined by a pair of sidewalls, a front wall and a rear wall, with the rear wall disposed in its extended, "down" or "opened" position.
Figure 3:
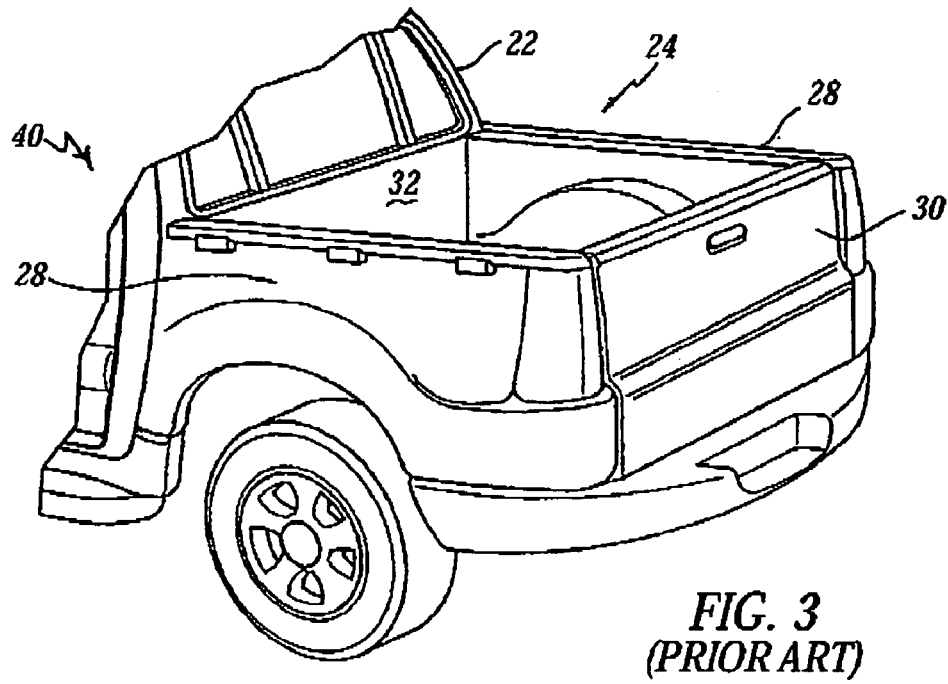
FIG. 3 is a partial perspective view of a crossover type vehicle having a cargo area defined by a pair of sidewalls, a front wall and a rear wall, with the rear wall disposed in its upright "closed" position.
Figure 4:
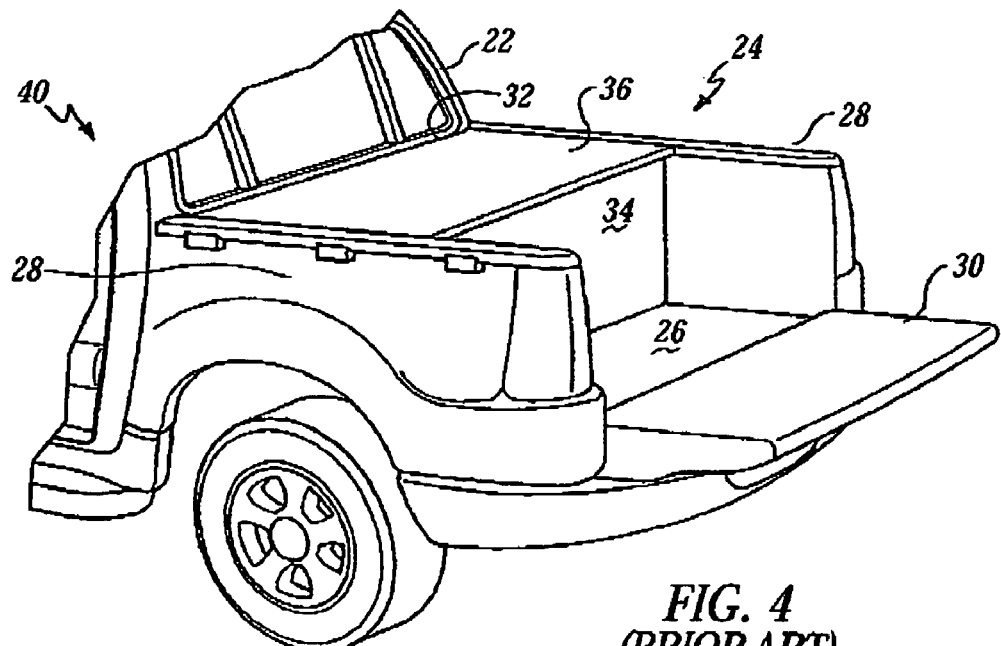
FIG. 4 is a partial perspective view of a crossover type vehicle having a cargo area defined by a pair of sidewalls, a front wall and a rear wall, with the rear wall disposed in its extended, "down" or "opened" position.
Figure 5:
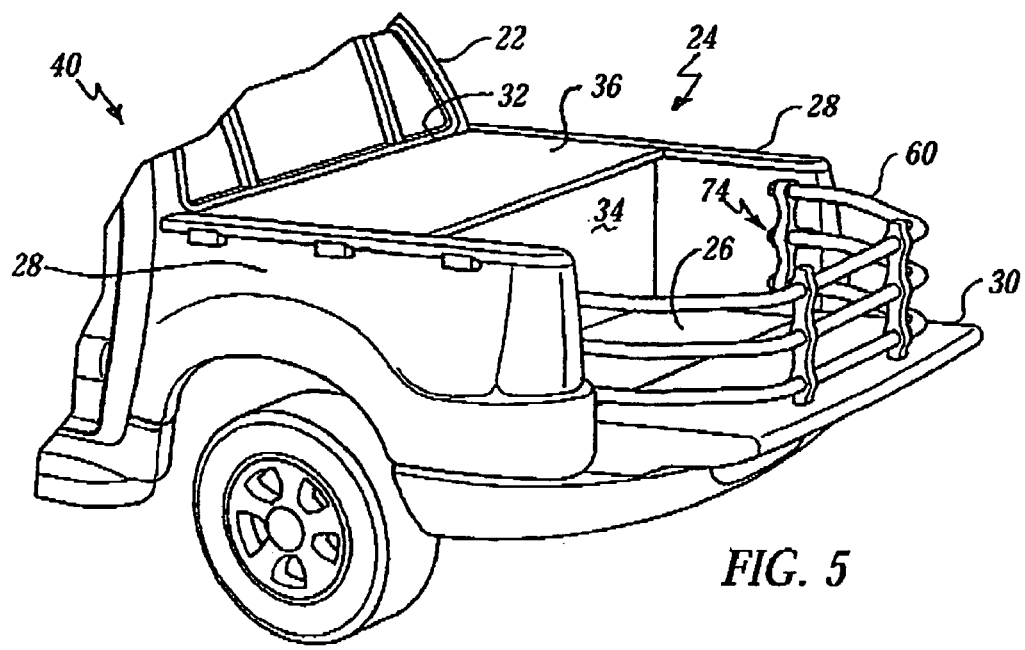
FIG. 5 is a partial perspective view of a crossover type vehicle with the rear wall disposed in its extended, "down" or "opened" position illustrating a bed extender of the present invention in its deployed position.

With the foregoing description of the related art in mind, the present invention is a vehicle cargo bed extender, generally indicated at 60 in FIGS. 5–10, where like numerals are used to designate like structure throughout the drawings. The vehicle cargo bed extender 60 is adapted to be employed in conjunction with a SUV/Pick-up cross-over style vehicle 40 as generally illustrated in FIGS. 3–6. However, those having ordinary skill in the art should appreciate that the present invention may also be employed in a standard pick-up truck style vehicle 20 as illustrated in FIGS. 1 and 2. As noted above, similar to standard pick-up truck designs, SUV/Pick-up cross-over vehicles 40 typically have a cargo area 24 defined by a bed 26 and a pair of upstanding sidewalls 28 spaced from one another on either side of the vehicle bed 26. In addition, the cargo area 24 is defined by a rear wall 30 extending between the upstanding sidewalls 28 at one end of the vehicle bed 26. The rear wall 30 is typically rotatable from an upright position to an extended position so as to be disposed substantially coplanar with the vehicle bed 26.

Figure 8:
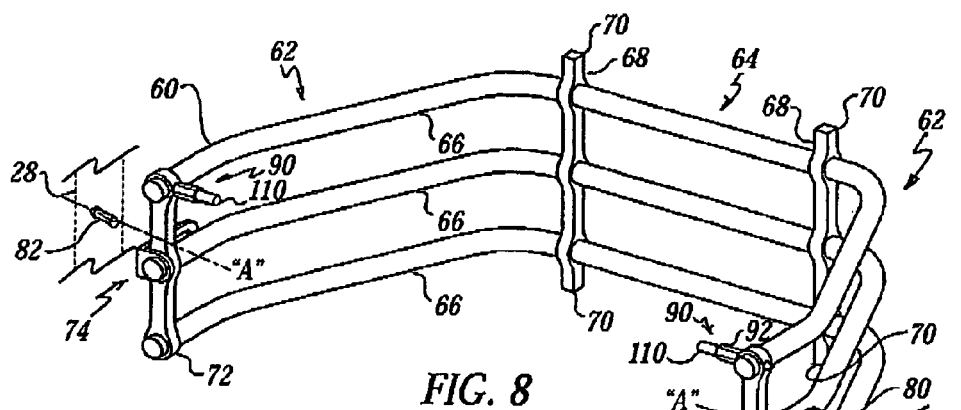
FIG. 8 is a perspective view of a bed extender of the present invention.

As best shown in FIG. 8, the cargo bed extender 60 of the present invention includes a pair of sidewalls, generally indicated at 62, spaced from one another and a center wall, generally indicated at 64, extending between the pair of sidewalls 62. The pair of sidewalls 62 and the center wall 64 cooperating to define a bed extender 60 having an open end. It should be appreciated that the walls 62 and 64 of the bed extender may constructed in a number of different manners. For example, the center wall of the bed may be constructed of a plurality of tubular members disposed longitudinally between rigid sidewalls. However, as shown in the Figures, the preferred embodiment the bed extender 60 includes a plurality of continuously formed tubular members 66 disposed longitudinally with respect to the vehicle bed 26 to form sidewalls 62 and a center wall 64 as a continuous piece.

To provide support for the tubular members 66, the bed extender 60 includes a pair of support posts 68. The support posts 68 are disposed on the center wall 64 near the respective sidewalls 62 and perpendicular to the tubular members 66. The support posts 68 integrate the tubular members 66 and structurally support the bed extender 60. Further, the support posts 68 have resilient members 70 disposed at either end to provide a non-marring contact surface located between the extender 60 and the rear wall 30 when the extender 60 is deployed, and between the extender 60 and the vehicle bed 26 when stowed. It should be appreciated that the bed extender 60 may include additional support posts spaced about the sidewalls 62 and center wall 64 if it is desired to provide additional support for the tubular members 66. The bed extender 60 also includes end members 72 that integrate the tubular members 66 and structurally support the bed extender 60 at it inner end.

Figure 6:
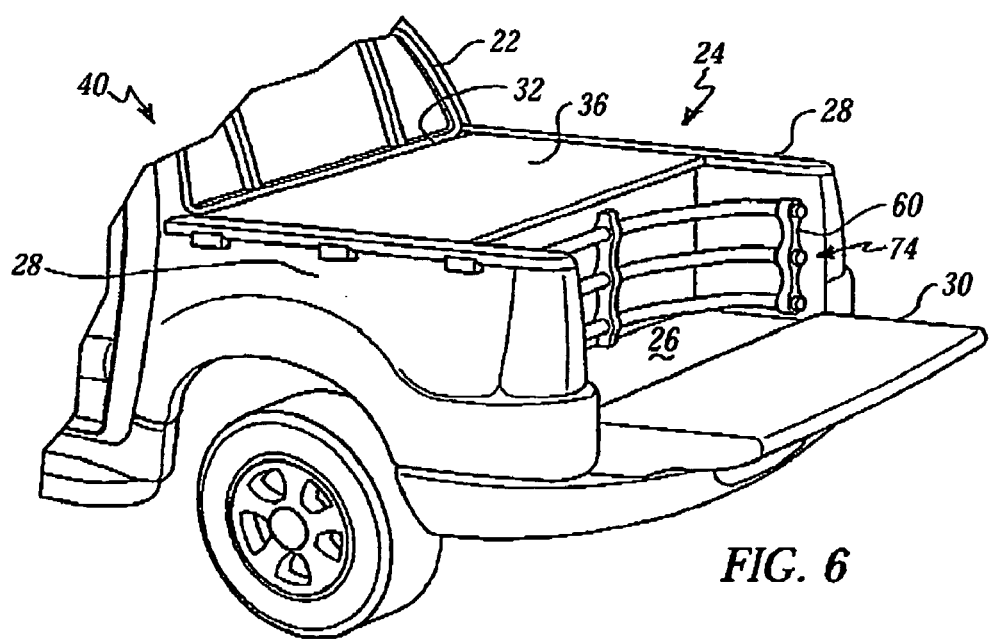
FIG. 6 is a partial perspective view of a crossover type vehicle with the rear wall disposed in its extended, "down" or "opened" position illustrating a bed extender of the present invention in its stowed position.

Generally speaking, the vehicle cargo bed extender 60 of the present invention is movably mounted between a deployed position (FIG. 5) and a stored position (FIG. 6). More specifically, the vehicle cargo bed extender 60 of the present invention is mounted to the vehicle sidewalls 62 such that it is pivotable between a stored position and a deployed position. To this end, each of the pair of sidewalls 62 of the bed extender 60 includes a pivot assembly, generally indicated in the Figures at 74. The pivot assembly 74 is disposed between the sidewall 62 of the bed extender 60 and a respective one of the pair of upright sidewalls 28 of the cargo bed 26. The pivot assembly 74 facilitates selective pivotal movement of the bed extender 60 between a stowed position (FIG. 6) wherein the open end of extender 60 is adjacent to the rear wall 30 of the vehicle when the rear wall 30 is in its upright position, and a deployed position (FIG. 5) so as to be supported by the rear wall 30 of the vehicle cargo bed when the rear wall 30 is in its extended position. When in the deployed position, the open end of the bed extender faces the cargo bed 26 thereby increasing the effective size of the vehicle cargo bed 26. It should be appreciated that in a broader sense, the pivot assembly 74 may be formed in any number of ways to facilitate a pivoting functionality of the bed extender 60. For example, the sidewalls 28 of the vehicle and the extender end members 72 may include cooperative openings in which a pivot pin is received to provide a pivot axis, or posts that extend from the vehicle sidewalls 28 to receive openings formed in the extender end members 72 may be provided.

In any event, it should be appreciated that the pivot assembly 74 may take on any of a variety of forms, but in the preferred embodiment, the present invention employs a pivot assembly that provides rectilinear movement as well as pivotal movement. More specifically, as shown in FIGS. 7A–10, the preferred embodiment employs a pivot assembly of the type that is described in applicant's co-pending application Ser. No. 10/938,812, entitled "Vehicle Cargo Bed Extender" which is hereby incorporated in its entirety by reference. In this case, each of the pair of sidewalls 62 of the bed extender 60 include a pivot assembly generally indicated at 74, which is disposed between the sidewall 62 of the bed extender 60 and a respective one of the pair of upright sidewalls 28 of the cargo bed 26. Each pivot assembly 74 includes a pivot axis "A" and a slot 80. The pivot axis "A" is defined by a post 82 with the slot 80 adapted to slidingly accept the post 82. The post 82 and the slot 80 cooperating to facilitate rectilinear longitudinal movement of the bed extender 60 relative to the cargo bed 26 of the vehicle 40 and pivotal movement of the bed extender 60 about the pivot axis "A" relative to the cargo bed 26 of the vehicle at at least two different positions along the slot 80.

Figure 9:
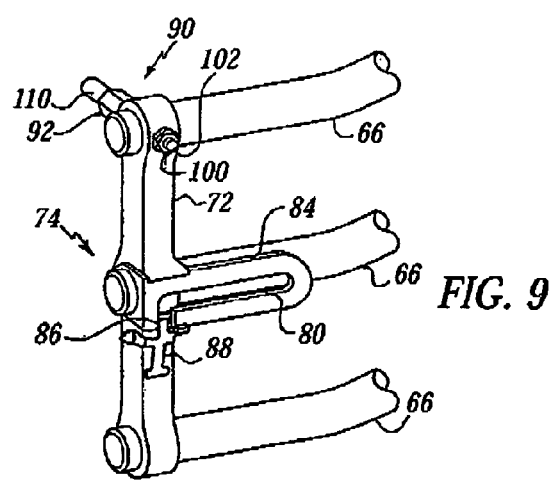
FIG. 9 is an enlarged partial perspective view of a portion of a bed extender of the present invention illustrating the pivot assembly.
Figure 10:
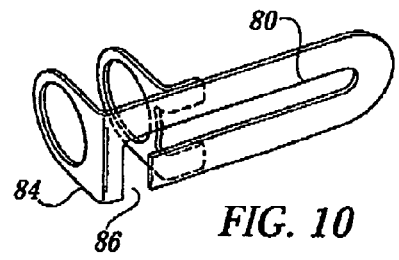
FIG. 10 is a perspective view of a portion of a pivot assembly of the present invention.

As shown in FIGS. 9 and 10, in the preferred embodiment, the slot 80 is formed in a slide bracket 84 that mounts to the end member 72 about the central tubular member 66. The slot 80 further includes an opening 86 that operatively allows the post 82 to be engaged to and separated from the slot 80 such that the bed extender 60 may be installed and removed from the vehicle. A retaining member 88 is mounted to the end member 72. The retaining member 88 is formed of a rigid yet flexible or resilient material, such as spring steel, for example. In the preferred embodiment illustrated in the figures, the retaining member 88 is a steel clip. The retaining member 88 is adapted to extend from the end member 72 to close the opening 86 and retain the post 82 within the slot 80. The resilient member 88 is further adapted to be selectively deflectable to allow the post 82 to pass through the opening 86 when the retaining member 88 is deflected. Thus, the vehicle cargo bed extender 60 of the present invention may be removed from the vehicle only when the retaining members 88 are depressed and deflected thereby allowing the post 82 to move past the opening 86. This additionally allows for ease of installation when the bed extender 60 has been removed.

The bed extender 60 can easily be installed on a vehicle by placing it at the rear of the cargo area 26 such that the openings 86 align over the posts 82 in the respective sidewalls 28 of the vehicle. Then, the bed extender 60 is pushed downward so that the posts 82 cause the retaining members 88 to be deflected so that the slots 80 accept the posts 82. The retaining members 88 then return to their original position and retain the posts 82 within the slots 80 of the slide bracket 84.

Figure 7A:
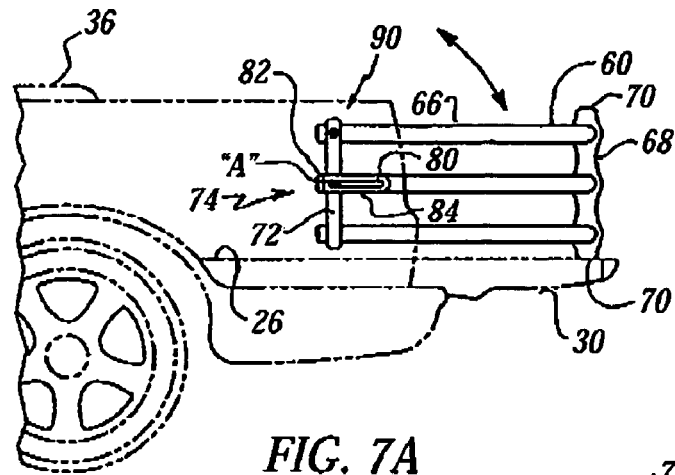
FIG. 7A is a partial side view of a crossover type vehicle with the rear wall disposed in its extended, "down" or "opened" position illustrating a bed extender of the present invention in its deployed position.
Figure 7B:
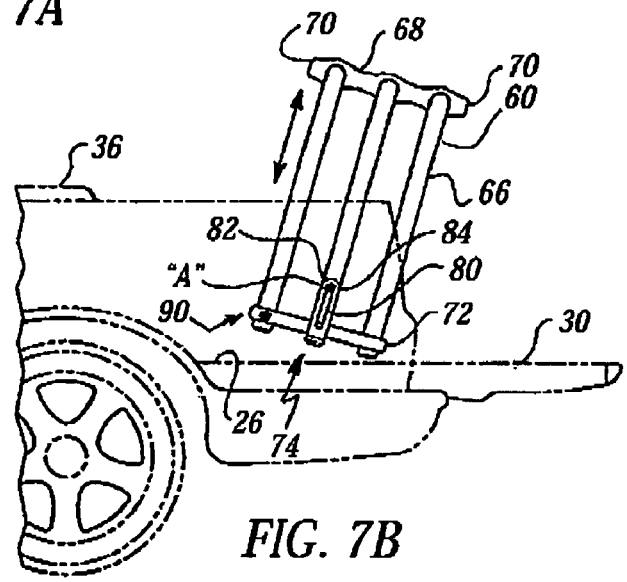
FIG. 7B is a partial side view of a crossover type vehicle with the rear wall disposed in its extended, "down" or "opened" position illustrating a bed extender of the present invention moved to an intermediate position.
Figure 7C:
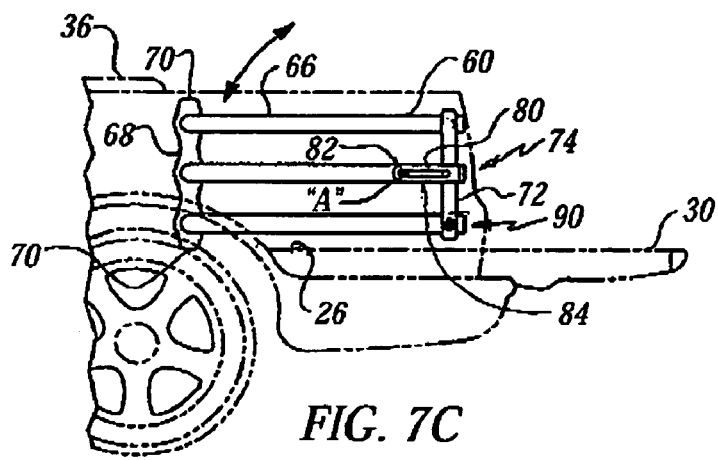
FIG. 7C is a partial side view of a crossover type vehicle with the rear wall disposed in its extended, "down" or "opened" position illustrating a bed extender of the present invention in its stowed position.

FIGS. 7A–7C illustrate how the bed extender 60 is moved from its deployed position, in which it is extended over the tailgate 30, to its stowed position in the cargo bed 26. In FIG. 7A, the bed extender 60 rests in the deployed position. The bed extender 60 has been moved fully to the right, as shown in the illustration so that the pivot axis "A", defined by post 82 is at the end of the slot 80 in the slide bracket 84 closest to the open end of the extender 60. When it is desired to stow the bed extender 60, the extender is pivoted upward about the post 82 at pivot axis "A" as indicated by the arrow in FIG. 7A. As shown in FIG. 7B, as the bed extender 60 nears the apex of its pivotal movement, it is moved rectilinearly downward as indicated by the arrow so that the slot 80 of the slide bracket 84 moves along the fixed post 82. It should be appreciated that the bed extender 60 may also be move rectilinearly along the slot 80 at any time during the pivotal movement from the deployed position to the generally upright position shown in FIG. 7B. Then, as shown in FIG. 7C, the bed extender 60 will have adequate clearance to avoid interference with a bed accessory, such as the tonneau cover 36 in the figures for example.

Figure 11:
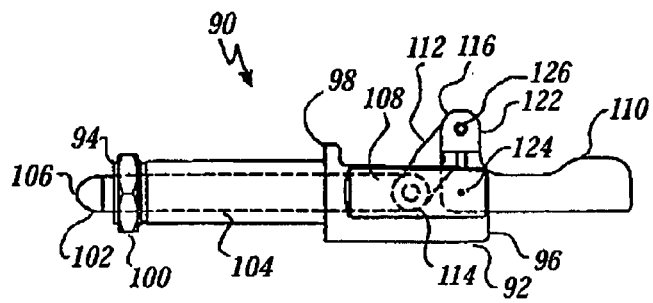
FIG. 11 is a perspective view of a lock assembly of the present invention shown in its retracted and unlocked position.
Figure 12A:
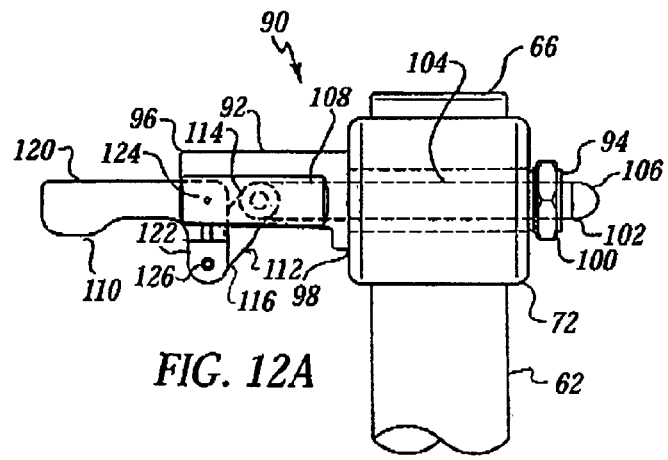
FIG. 12A is a side view of a lock assembly of the present invention shown installed in the sidewall of the bed extender in the retracted and unlocked position.
Figure 12B:
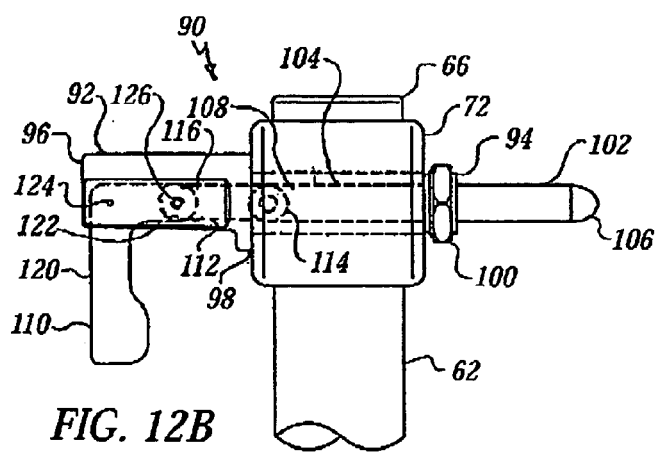
FIG. 12B is a side view of a lock assembly of the present invention shown installed in the sidewall of the bed extender in the extended and locked position.

The present invention also includes at least one lock assembly, generally indicated at 90 in the Figures. The lock assembly 90 has a main body 92 that is mounted upon one of the sidewalls 62 of the bed extender. More specifically, as shown in FIGS. 7A–7C, 11, and 12A–12B, the lock assembly 90 is disposed through and is operatively retained within the end member 72 through the end of one of the tubular members 66. As best shown in FIGS. 11, 12A, and 12B, the main body 92 has a distal end 94, a proximate end 96, and a circumferential stop shoulder 98. The distal end 94 of the main body 92 is threaded, and when assembled, is inserted and threaded through the end member 72 to the stop shoulder 98. A retaining nut 100 is threadingly fitted upon the distal end 94 to retain the lock assembly 90 in the bed extender 60. It should be appreciated that other retention methods may be employed with the main body 92 of the lock assembly 90 to mount it in the bed extender 60 without departing from the scope of the present invention. For example, the main body 92 and the opening in the end member 72 may be cooperatively threaded, or the distal end of the main body 92 may include a groove to receive some form of retaining clip.

The lock assembly 90 also includes a locking pin 102 that is slidingly received within a central bore 104. The locking pin 102 has a distal end 106 and a proximate end 108. The locking pin 102 is operable to be selectively extended and retracted from the distal end 94 of the main body 92 to engage with and disengage from the vehicle sidewall 28 respectively. More specifically, corresponding openings (not shown) are formed in vehicle sidewalls 28 which cooperatively accept the distal end 106 of the locking pin 102 to retain the bed extender 60 in the stowed and deployed positions.

The lock assembly 90 further includes a handle 110 that is disposed at the proximate end 96 of the main body 92 opposite the locking pin 102 and a lever arm 112 operatively disposed therebetween. The lever arm 112 has a distal end 114 and a proximate end 116. The handle 110 and the lever arm 112 are operative to move between a first position (FIG. 12A) and a second position (FIG. 12B) thereby cooperating to facilitate the retraction and the extension of the locking pin 102 from the main body 92. The extension of the locking pin 102 (FIG. 12B) locks the bed extender 60 to the vehicle sidewall 28 in both the stowed and in the deployed positions to prevent any uncommanded movement of the extender 60.

The handle 110 includes a main arm 120 and an extension arm 122 that is formed perpendicular to the main arm 120. The handle 110 has a handle pivot point 124 formed at the junction of the main arm 120 and the extension arm 122, and a lever arm pivot point 126 formed at the end of the extension arm 122 opposite the handle pivot point 124. The handle 110 is pivotably mounted in the proximate end 96 of the main body 92 at the handle pivot point 124. The extension arm 122 is pivotably connected to the proximate end 116 of the lever arm 112 and the distal end 114 of the lever arm 112 is pivotably mounted to the proximate end 108 of the locking pin 102. In this manner, the selective movement of the handle 110 between the first and the second positions causes the extension arm 122 and the lever arm 112 to move the locking pin 102 longitudinally within the central bore 104 of said main body 92 between the extended (FIG. 12B) and retracted (FIG. 12A) positions.

The locking assembly 90 is further operative to hold the locking pin 102 in the extended and the retracted positions respectively until selectively moved between positions. To accomplish this operative action, the handle pivot point 124 and the connection points between the extension arm 122, the lever arm 112, and the locking pin 102 are so placed with respect to each other linearly that moving the handle 110 to either the first position or the second position causes the handle 110 to move "over (or past) center" so that the handle 110 is held in its respective position.

Referring again to FIGS. 7A through 7B, when the bed extender 60 is in the deployed position, the lock assembly 90 will be engaged to the vehicle sidewall 26 to lock the extender 60 in place and prevent any uncommanded movement. When it is desired to stow the bed extender 60, the lock assembly 90 is disengaged from the vehicle sidewall 26 so that it can be pivoted and moved rectilinearly as shown in FIGS. 7B and 7C. It should be appreciated that more than one lock assembly 90 may be employed and in the preferred embodiment one lock assembly is employed on each side of the bed extender 60. Once the bed extender 60 is placed in the bed in the stowed position as illustrated in FIG. 7C, the lock assembly 90 is reengaged with the vehicle sidewall 26 to lock the extender 60 in place.

Thus, the vehicle cargo bed extender of the present invention overcomes the drawbacks and disadvantages of the prior art by providing an increase in the effective cargo area of the vehicle while, at the same time, providing a pivoting means for rapid changeover from one mode of vehicle operation to another. The present invention also provides an improved locking and retaining mechanism to lock the bed extender in both the deployed and stowed positions to prevent uncommanded movement. The locking mechanism of the present invention is simple, cost effective, easy to use, and remains in the extended and retracted position until selectively moved. Furthermore, since the locking mechanism of the present invention latches into both the retracted and extended positions, this allows a single individual to lock and unlock the lock mechanisms of bed extender without assistance. Thus, one person is able to pivot the bed extender between the deployed and stowed positions, as well as install or remove the bed extender from the vehicle by themselves. The simple cost effective design and the latching capability of the lock mechanisms of the present invention thereby greatly enhance the overall functionality of the bed extender.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

I claim:

1. A vehicle cargo bed extender adapted to be employed in conjunction with a vehicle having a cargo bed defined by a pair of upstanding bed sidewalls spaced from one another on either side of the vehicle cargo bed and a rear wall extending between the upstanding sidewalls at the rear end of the bed, wherein the rear wall is rotatable from an upright position to an extended position so as to be disposed substantially co-planar with the vehicle bed, said cargo bed extender comprising:

a pair of sidewalk spaced from one another, a center wall extending between said pair of sidewalls, said pair of sidewalls and said center wall cooperating to define said bed extender having an open end;

each of said pair of sidewalls of said bed extender including a pivot assembly disposed between said sidewall of said bed extender and a respective one of the pair of upright sidewalls of cargo bed to facilitate selective pivotal movement of said bed extender between a stowed position wherein said open end of said bed extender is adjacent to the rear wall of the vehicle when the rear wall is in the upright position and a deployed position so as to be supported by the rear wall of the vehicle cargo bed when the rear wall is in the extended position such that the open end of said bed extender faces the cargo bed thereby increasing the effective size of the vehicle cargo bed; and at least one lock assembly having a main body, defined by longitudinal ends and a central bore extending between said longitudinal ends, and coupled to one of said sidewalls of said bed extender, said lock assembly including a locking pin that is axially moveable within said central bore between an extended position and a retracted position so as to extend from one of said longitudinal ends of said main body to engage with and disengage from the vehicle sidewall respectively, said lock assembly further including a handle disposed at the end of said main body opposite said locking pin and a lever arm operatively disposed therebetween; said handle and said lever arm operative to move between a first and a second position thereby cooperating to facilitate said extension and said retraction of said locking pin from said main body such that said extension of said locking pin locks said bed extender to the vehicle sidewall in said stowed and said deployed positions to prevent any uncommanded movement of said extender.

2. A vehicle cargo bed extender as set forth in claim 1 wherein at least a portion of said lever arm is selectively interposed within said central bore.

* * * * *

UNITED STATES PATENT AND TRADEMARK OFFICE
CERTIFICATE OF CORRECTION

PATENT NO. : 7,121,604 B2  Page 1 of 1
APPLICATION NO. : 10/938166
DATED : October 17, 2006
INVENTOR(S) : Troy R. Reed It is certified that error appears in the above-identified patent and that said Letters Patent is hereby corrected as shown below:

In Claim 1, line 12, reads "a pair of sidewalk …"; should read --a pair of sidewalls …--

Signed and Sealed this

Ninth Day of January, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,121,604 B1 | Page 1 of 1 |
| APPLICATION NO. | : 10/938166 | |
| DATED | : October 17, 2006 | |
| INVENTOR(S) | : Troy R. Reed | |

It is certified that error appears in the above-identified patent and that said Letters Patent is hereby corrected as shown below:

In Claim 1, line 12, reads "a pair of sidewalk ..."; should read --a pair of sidewalls ...--

Signed and Sealed this

Twenty-third Day of January, 2007

JON W. DUDAS
*Director of the United States Patent and Trademark Office*